(12) United States Patent
Misiak et al.

(10) Patent No.: US 6,642,337 B1
(45) Date of Patent: *Nov. 4, 2003

(54) STABILIZED CYANOACRYLATE ADHESIVES

(75) Inventors: Hanns-Roland Misiak, Wennigsen (DE); Dagmar Behn, Hannover (DE)

(73) Assignee: Henkel Kommanditgesellschaft auf Aktien, Duesseldorf (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/554,388

(22) PCT Filed: Nov. 9, 1998

(86) PCT No.: PCT/EP98/07149

§ 371 (c)(1),
(2), (4) Date: Jul. 31, 2000

(87) PCT Pub. No.: WO99/25774

PCT Pub. Date: May 27, 1999

(30) Foreign Application Priority Data

Nov. 17, 1997 (DE) .......................................... 197 50 802

(51) Int. Cl.$^7$ .............................................. C08F 222/36
(52) U.S. Cl. ..................... 526/298; 526/220; 526/222; 526/82; 526/84; 526/85; 526/204; 526/234; 526/307; 526/329.3; 526/341; 524/555; 524/556

(58) Field of Search ................................. 526/298, 201, 526/220, 297; 524/555, 556

(56) References Cited

U.S. PATENT DOCUMENTS

| 3,254,111 A | | 5/1966 | Hawkins et al. | .......... 260/465.4 |
| 3,654,340 A | | 4/1972 | Banitt | ...................... 260/465.4 |
| 5,665,817 A | * | 9/1997 | Greff et al. | .................. 524/776 |
| 6,093,780 A | * | 7/2000 | Attarwala | .................... 526/298 |

FOREIGN PATENT DOCUMENTS

| DE | 21 00 026 | 7/1972 |
| DE | 41 09 105 | 9/1992 |
| EP | 0 538 734 | 4/1993 |
| EP | 0 579 476 | 1/1994 |
| GB | 1225726 | 3/1971 |

OTHER PUBLICATIONS

Ullman, Encyclopedia of Industrial Chemistry, vol. A1, p. 240, Verlag Chemie Weinheim (1985).

* cited by examiner

Primary Examiner—Tatyana Zalukaeva
(74) Attorney, Agent, or Firm—Stephen D. Harper; Daniel S. Ortiz

(57) ABSTRACT

The problem addressed by the invention was to find an anionic polymerization inhibitor for cyanoacrylate adhesives containing one or more cyanoacrylates, stabilizers against anionic and radical polymerization and auxiliaries typically used in such adhesive systems which, besides a reliable inhibiting effect, would counteract any increase in the setting time after storage. This problem was solved by using 2-oxo-1,3,2-dioxathiolanes as inhibitors.

17 Claims, No Drawings

STABILIZED CYANOACRYLATE ADHESIVES

FIELD OF INVENTION

This invention relates to new cyanoacrylate adhesives which are distinguished by a particularly favorable inhibitor against anionic polymerization.

BACKGROUND OF THE INVENTION

Cyanoacrylate adhesives are monomeric adhesives. They are based on esters of alpha-cyanoacrylic acid. These esters can be polymerized both by radical and by anionic mechanisms. The anionic polymerization is initiated by traces of moisture which are to be found on almost all surfaces. Accordingly, cyanoacrylate adhesives set very quickly when introduced between two surfaces stored under ambient conditions.

The particular advantage of cyanoacrylate adhesives in terms of adhesives technology lies precisely in this reactivity of theirs coupled with the high bonds strengths they develop, especially with polar substrates. However, stabilizers have to be added both for the production and for the storage of the adhesives. The stabilizer systems have to be selected so that no polymerization occurs during transportation and storage in sealed drums, even at elevated temperatures and after long periods, whereas after application polymerization occurs immediately.

Accordingly, besides known radical polymerization inhibitors, inhibitors against anionic polymerization are generally added to cyanoacrylate adhesives.

Thus, it is proposed in DE-OS 21 00 026 to add a strongly acidic cation exchanger as inhibitor. Cation exchangers based on crosslinked polystyrenes containing sulfonic acid groups are said to be preferred. The disadvantage of this approach is that the ion exchanger added can easily impede the outflow of the adhesive and that, as a solid, it does not act throughout the entire volume of the adhesive.

It is proposed in German patent application DE 41 09 105 to surface-modify storage containers for cyanoacrylate adhesives in such a way that they contain acid groups. Although this proposal can be successfully implemented, it is again attended by the problem that the inhibitor effect only occurs in the vicinity of the container wall.

Another method of stabilizing cyanoacrylate adhesives is to add sulfur dioxide as inhibitor. Although this measure has been successfully applied in practice, it is important to bear in mind that sulfur dioxide is a gaseous substance and that uniform addition is difficult with the result that quality variations can occur. In addition, sulfur dioxide can escape from the adhesive containers by diffusion during storage.

Apart from these considerations, it is proposed in European patent application 579 476 to add between 0.1 and 10% by weight of a sulfur-containing or even cyclic compound to cyanoacrylate monomers. Cyclic organic sulfates, sulfites, sulfoxides, sulfinates, for example 2-oxo-1,3,2-dioxathiolanes, are proposed as compounds. According to the European patent application, these compounds are said to be used in quantities of 0.1% by weight (1,000 ppm) to 10% by weight. The purpose of using them is to raise the ceiling temperature and hence to improve the thermal stability of the adhesives. There are no references in the cited European patent application to the use of the compounds in question to stabilize the monomeric adhesives

SUMMARY OF THE INVENTION against anionic polymerization.

Against this background, the problem addressed by the present invention was to provide an improved inhibitor against anionic polymerization for monomeric cyanoacrylate adhesives. In particular, this inhibitor would be effective throughout the entire volume of the adhesive and would be able to be added more uniformly and more easily than gases.

Another problem addressed by the invention was to provide an inhibitor for cyanoacrylate adhesives which would drastically extend the setting time over the storage period. In addition, discoloration of the adhesive during storage would be prevented.

Accordingly, the present invention relates to a cyanoacrylate adhesive containing one or more cyanoacrylates, inhibitors against radical polymerization, inhibitors against anionic polymerization and optionally typical auxiliaries used in such adhesive systems, characterized in that 2-oxo-1,3,2-dioxathiolanes are present as the anionic polymerization inhibitor.

DETAILED DESCRIPTION OF THE INVENTION

The 2-oxo-1,3,2-dioxathiolanes to be used in accordance with the invention as inhibitors against anionic polymerization are known, commercially available compounds. In simple terms, they may be regarded as esters of sulfurous acid with vicinal dialcohols. Among the 2-oxo-1,3,2-dioxathiolanes mentioned, compounds substituted by one or more alkyl groups are preferred. Suitable alkyl groups have a chain length of 1 to 8 carbon atoms. A particularly suitable substance is 4,5-dimethyl-2-oxo-1,3,2-dioxathiolane which is a liquid with a boiling point of 185° C.

The 2-oxo-1,3,2-dioxathiolanes to be used in accordance with the invention are used in quantities of 50 to 5,000 ppm, preferably in quantities of 100 to 1,000 ppm and more preferably in quantities of 200 to 700 ppm. The quantity used is determined in particular by the level of stabilization required, i.e. for example by the container size, by the need to be able to store opened containers and the like.

The cyanoacrylate adhesives according to the invention consist mainly of one or more esters of alpha-cyanoacrylic acid. These esters have the general formula $H_2C=C(CN)-COOR$, in which R is an alkyl, alkenyl, cycloalkyl, aryl, alkoxyalkyl, aralkyl or haloalkyl group, more particularly a methyl, ethyl, n-propyl, isopropyl, n-butyl, pentyl, hexyl, allyl, methallyl, crotyl, propargyl, neopentyl, cyclohexyl, benzyl, phenyl, cresyl, 2-chloroethyl, 3-chloropropyl, 2-chlorobutyl, trifluoroethyl, 2-methoxyethyl, 3-methoxybutyl and 2-ethoxyethyl group. The cyanoacrylates mentioned above are known to the expert on adhesives, cf. Ullmann, Encyclopaedia of Industrial Chemistry, Vol. A1, page 240, Verlag Chemie Weinheim (1985) and U.S. Pat. No. 3,254,111 and U.S. Pat. No. 3,654,340. Preferred monomers are methoxyethyl, ethoxyethyl, methyl, ethyl, propyl or butyl esters of 2-cyanoacrylic acid.

The cyanoacrylates mentioned are present in the adhesives in quantities of 99.99 to 90% by weight. Cyanoacrylates of which the alcohol component derives from $C_{1-10}$ alcohols which may even be cyclic, branched or perfluorinated are preferred.

In addition, the cyanoacrylate adhesives according to the invention may contain an inhibitor against radical polymerization. Examples of such inhibitors are quinones, hydroquinones, p-methoxyphenol and sterically hindered phenols, phenothiazine and the like.

The cyanoacrylate adhesives according to the invention may also contain thickeners as further auxiliaries. This is desirable in particular when the materials to be bonded are porous and would otherwise readily absorb the low-viscosity adhesive. The thickeners used may be selected from many types of polymers including, for example, polymethyl methacrylate, other methacrylate copolymers, acrylate rubber, cellulose derivatives, polyvinyl acetate or poly-alpha-cyanoacrylate. A typical quantity of thickener is generally about 20% by weight or less, based on the adhesive as a whole. In addition to or instead of the thickener, the cyanoacrylate adhesives according to the invention may also contain reinforcing additives. Examples of reinforcing additives include acrylic elastomers, acrylonitrile copolymers, elastomers or fluororubbers. In addition, inorganic additives, for example large-surface silicates preferably coated with polydialkylsiloxanes, may be used. In addition to or instead of these auxiliaries, the adhesives according to the invention may contain binding accelerators, for example crown ethers or calixarenes (polyarenes with a helical structure).

The cyanoacrylate adhesives according to the invention may also contain substances which increase their thermal stability, for example the sulfur compounds mentioned in EP 579 476.

In addition to or instead of the additives mentioned, the cyanoacrylate adhesives according to the invention may also contain plasticizers. Their function is to prevent the adhesive bond obtained from becoming brittle. Examples of plasticizers include $C_{1-10}$ alkyl esters of dibasic acids, more particularly sebacic acid, phthalic acid or malonic acid. Other plasticizers are diaryl ethers and polyurethanes and the like. Finally, the adhesives according to the invention may also contain dyes, pigments, odor enhancers and the like.

Cyanoacrylate adhesives protected against premature curing, even under adverse conditions, can be obtained using the proposed inhibitors against anionic polymerization.

EXAMPLES 400 ppm of hydroquinone was added as a radical polymerization inhibitor to ethyl 2-cyanoacrylate. In addition, the following anionic polymerization inhibitors were added:

test 1, 5 ppm sulfur dioxide;

test 2, 25 ppm sulfur dioxide;

test 3, 200 ppm 4,5-dimethyl-2-oxo-1,3,2-dioxathiolane.

The setting times of all three adhesives were measured. The measurement was repeated after 8 months. After the samples had been prepared, the setting time under standard conditions was between 2 and 4 seconds. After storage, the setting time was 5 seconds for test 1, 18 seconds for test 2 and 3 to 4 seconds for test 3 (invention).

In every case, the viscosity of the adhesive samples was in the acceptable range.

Test Result:

The $SO_2$ concentrations used resulted in a drastic extension of the contact time over a prolonged period. By contrast, this effect was virtually absent from the samples stabilized in accordance with the invention using 4,5-dimethyl-2-oxo-1,3,2-dioxathiolane. The inhibiting effect, as measured from the increase in viscosity, is comparable with that of sulfur dioxide and the viscosity remains constant.

What is claimed is:

1. A cyanoacrylate adhesive comprised of
   (a) one or more cyanoacrylates;
   (b) one or more radical polymerization inhibitors; and
   (c) one or more anionic polymerization inhibitors, comprising from 50 to 700 ppm of a 2-oxo-1,3,2-dioxathiolane.

2. The cyanoacrylate adhesive of claim 1, wherein the 2-oxo-1,3,2-dioxathiolane is substituted in the 4-position with a $C_1$–$C_8$ alkyl group.

3. The cyanoacrylate adhesive of claim 1, wherein the 2-oxo-1,3,2-dioxathiolane is substituted in the 5 position with a $C_1$–$C_8$ alkyl group.

4. The cyanoacrylate adhesive of claim 1 wherein at least one anionic polymerization inhibitor comprises 4,5-dimethyl-2-oxo-1,3,2-dioxathiolane.

5. The cyanoacrylate adhesive of claim 1 wherein said 2-oxo-1,3,2-dioxathiolane is present at a concentration of 50 to 100 ppm.

6. The cyanoacrylate adhesive of claim 1 wherein said 2-oxo-1,3,2-dioxathiolane is present at a concentration of 100 to 700 ppm.

7. The cyanoacrylate adhesive of claim 1 wherein said 2-oxo-1,3,2-dioxathiolane is present at a concentration of 200 to 700 ppm.

8. The cyanoacrylate adhesive of claim 1 comprising one or more cyanoacrylates which are esters of alpha-cyanoacrylic acid and a $C_{1-10}$ alcohol.

9. The cyanoacrylate adhesive of claim 1, additionally comprising one or more additives selected from the group consisting of plasticizers, binding accelerators, thickeners, dyes, reinforcing additives, pigments, phase transfer catalysts, and auxiliaries for raising the ceiling temperature of the cyanoacrylate adhesive.

10. The cyanoacrylate adhesive of claim 1 wherein at least one of the radical polymerization inhibitors is selected from the group consisting of quinones, hydroquinones, p-methoxy-phenol, sterically hindered phenols, and phenothiazine.

11. The cyanoacrylate adhesive of claim 1 wherein the cyanoacrylate comprises 90 to 99.99% by weight of the cyanoacrylate adhesive.

12. A cyanoacrylate adhesive comprised of
   (a) one or more cyanoacrylates, at least one of said cyanoacrylates being an ester of alpha-cyanoacrylic acid and a $C_{1-10}$ alcohol;
   (b) one or more radical polymerization inhibitors; and
   (c) one or more anionic polymerization inhibitors comprising 50 to 700 ppm of 2-oxo-1,3,2-dioxathiolanes substituted in the 4 position, the 5 position or both the 4 and 5 positions with a $C_1$–$C_8$ alkyl group.

13. The cyanoacrylate adhesive of claim 12 wherein at least one of the 2-oxo-1,3,2-dioxathiolanes is 4,5-dimethyl-2-oxo-1,3,2-dioxathiolane.

14. The cyanoacrylate adhesive of claim 12, comprising one or more cyanoacrylates which are esters of alpha-cyanoacrylic acid and a $C_{1-10}$ alcohol.

15. The cyanoacrylate adhesive of claim 12 additionally comprising one or more additives selected from the group consisting of plasticizers, binding accelerators, thickeners, dyes, reinforcing additives, pigments, phase transfer catalysts, and auxiliaries for raising the ceiling temperature of the cyanoacrylate adhesive.

16. The cyanoacrylate adhesive of claim 12 wherein at least one of the radical polymerization inhibitors is selected from the group consisting of quinones, hydroquinones, p-methoxyphenol, sterically hindered phenols, and phenothiazine.

17. The cyanoacrylate adhesive of claim 12 wherein said 2-oxo-1,3,2-dioxathiolanes are present at a concentration of 200 to 700 ppm.

* * * * *